United States Patent [19]

Putnam et al.

[11] Patent Number: 4,745,857
[45] Date of Patent: May 24, 1988

[54] PROGRAMMABLE PAD PRINTING APPARATUS AND METHOD

[75] Inventors: Thomas P. Putnam, Keene; Roy A. Sunter, Fitzwilliam; David A. Kearney, Keene; Richard J. Lothrop, Munsonville, all of N.H.

[73] Assignee: Markem Corporation, Keene, N.H.

[21] Appl. No.: 834,413

[22] Filed: Feb. 28, 1986

[51] Int. Cl.$^4$ .............................................. B41F 17/00
[52] U.S. Cl. ...................................... 101/44; 101/151; 101/163; 101/425; 101/170
[58] Field of Search ................... 101/35, 44, 41, 4, 163, 101/151, 170, 193, 211, 201, 368, 327, 171, 424, 425, 423

[56] References Cited

U.S. PATENT DOCUMENTS

| | | | |
|---|---|---|---|
| 2,641,996 | 6/1953 | Turner et al. | 101/4 |
| 2,776,617 | 1/1957 | Hendrickson | 101/44 X |
| 3,247,787 | 4/1966 | Ryckman . | |
| 3,606,162 | 9/1971 | Lehmann . | |
| 3,688,695 | 9/1972 | James . | |
| 3,867,882 | 2/1975 | Ahlgren et al. | 101/35 |
| 3,868,902 | 3/1975 | Bradshaw et al. . | |
| 3,910,183 | 10/1975 | Noren et al. . | |
| 3,916,784 | 11/1975 | Dubuit | 101/41 |
| 3,960,072 | 6/1976 | Ahlgren et al. . | |
| 3,990,364 | 11/1976 | Paans . | |
| 4,019,436 | 4/1977 | Handweiler et al. . | |
| 4,060,031 | 11/1977 | Philipp . | |
| 4,178,632 | 12/1979 | Anthony . | |
| 4,221,997 | 9/1980 | Flemming . | |
| 4,239,431 | 12/1980 | Davini . | |
| 4,314,504 | 2/1982 | Combeau . | |
| 4,380,696 | 4/1983 | Masaki . | |
| 4,433,953 | 2/1984 | Muench | 101/44 X |
| 4,557,191 | 12/1985 | Speicher | 101/35 X |

FOREIGN PATENT DOCUMENTS

| | | |
|---|---|---|
| 8528619.2 | 12/1985 | Fed. Rep. of Germany . |
| 56-56866 | 5/1981 | Japan . |
| 202856 | 11/1984 | Japan .................................. 101/163 |
| 763572 | 12/1956 | United Kingdom . |
| 881945 | 11/1961 | United Kingdom . |
| 210877 | 4/1968 | U.S.S.R. . |

OTHER PUBLICATIONS

P. Wasserman, "Looking at Pad Transfer Printing", Screen Printing, vol. 69, No. 10, pp. 122–125, (Oct. 1979).
Teca–Print AG Advertising Literature, (1983).
Tampoflex GmbH Advertising Literature, (Sep. 1983).
Dependable Machine Co. Advertising Literature, (1983).

Primary Examiner—Clifford D. Crowder
Attorney, Agent, or Firm—Robbins & Laramie

[57] ABSTRACT

A programmable printing system for product marking applications is described in which a printing member is carried by an articulated mechanical arm, such as a robot arm. Due to the enhanced maneuverability and reach of the articulated arm, printing can be carried out on surfaces which would not be accessible to conventional types of conveyor-mounted product marking devices. The articulated arm is controlled by a programmable control means which can be reprogrammed as needed in order to print on objects having different sizes, shapes and orientations, or to print at more than one location on the same object. The apparatus finds particular utility in connection with pad transfer printing, including multicolor pad transfer printing, but is also applicable to other printing methods.

14 Claims, 9 Drawing Sheets

PROGRAMMABLE PAD PRINTING APPARATUS AND METHOD

BACKGROUND OF THE INVENTION

1. Field of the Invention

The invention relates generally to printing apparatus and methods, and is specifically concerned with a printing apparatus employing an articulated mechanical arm, such as a robot arm. The invention also relates to a multicolor printing method which may be carried out using such apparatus.

2. Description of the Prior Art

In a typical product marking installation, the printing or marking device is situated at a fixed position with respect to the product conveyor and is arranged to print at a selected location on the surface of the product as the latter is brought into position by the conveyor. Various types of marking devices have been used for this purpose, including rotary devices and reciprocating or stamping mechanisms. Rotary printers are generally used when it is desired to print on moving objects, while reciprocating or stamping mechanisms are usually employed when the object is to be printed while it is temporarily at rest, as would occur on an intermittently moving conveyor.

With conventional types of product marking devices, it is generally necessary that the products be of uniform size and that they be oriented in the same way on the conveyor. Since the marking device is essentially dedicated to a particular type of product, a change from one product line to another usually requires that some mechanical alteration be made to the marking device or its mounting apparatus, in order to adapt to the different size or orientation of the new product. This presents difficulties in manufacturing plants where product lines are changed frequently, or in plants which have a number of different product lines.

Another difficulty with conventional product marking systems is that it is usually possible to print on only one face of the product, unless more than one marking device is employed. Moreover, the printed legend can usually be applied only to the most easily accessible surfaces of the product, which are usually the top and bottom surfaces of the product and the two side surfaces which lie parallel to the edges of the conveyor. The forward and rear faces of the product, which extend transverse to the conveyor direction, ordinarily cannot be printed because to do so would require mounting the marking device in a position at which it would obstruct the product movement on the conveyor.

A particularly useful type of printing for some types of product marking applications is pad transfer printing. This technique involves the use of an engraved printing plate and a resilient transfer pad, the latter usually consisting of silicone rubber. The printing plate is inked and then scraped so that the ink remains only in the engraved areas which define the legend to be printed. The resilient pad is brought first into contact with the printing plate, which releases the wet ink image to the pad, and is then brought into contact with the surface to be printed. The surface characteristics of the silicone rubber are such that the ink readily releases from the pad and adheres to the print receiving surface.

Pad transfer printing is a useful technique for printing precise or detailed legends, because the process does not rely on mechanical impact or friction and the image can therefore be transferred with very little distortion. In addition, the elastic deformation of the transfer pad allows an image to be transferred from a flat printing plate to virtually any type of raised or irregularly shaped surface, as well as to flat surfaces. The process is also useful for "wet on wet" printing of multicolor images, since the ink-repellent transfer pad will not disturb a previously deposited ink image when the next color is being printed on the substrate.

Despite the inherent advantages of pad transfer printing, existing types of pad transfer printing machines are not well suited to certain product marking applications. Typically, the transfer pad is carried by a mechanical linkage which moves the pad along a fixed path between the printing plate and a work station. With the exception of minor adjustments for pad height, compression distance, and the like, the path of movement of the pad is preset and cannot be altered to suit particular product marking applications. Thus, for example, if the printing stroke of the pad occurs in a vertically downward direction, as is usually the case, the printing apparatus must be mounted above the product conveyor and the products must be positioned with their print receiving surfaces facing upwardly. This may be difficult or impossible in certain situations. Pad transfer machines with swiveling pad mechanisms have been developed to allow printing on vertical or inclined surfaces, but these machines still allow only a limited range of pad movement and cannot be universally employed with any desired product shape or orientation.

When it is desired to print multicolor images using the pad transfer technique, it is usually necessary to employ a separate pad or printing machine for each color. This results from the fact that most pad transfer machines are arranged to print from only a single printing plate. When printing multicolor images on products carried by a moving product conveyor, the product must move from one printing station to the next in order to receive each successive color separation image. This can give rise to registration errors unless the movement of the conveyor is controlled very precisely.

SUMMARY OF THE INVENTION

In accordance with the present invention, the foregoing disadvantages and limitations are avoided by providing a programmable printing system in which a printing member is carried by an articulated mechanical arm, such as a robot arm. By virtue of the enhanced maneuverability and reach of the articulated arm, printing can be carried out on surfaces which would not be accessible to conventional types of conveyor-mounted product marking devices. The movement of the articulated arm is controlled by a programmable control means which can be reprogrammed to adapt the apparatus to different uses. With suitable reprogramming, the apparatus of the present invention is capable of printing on objects having different sizes, shapes and orientations. It therefore becomes possible to use the same printing apparatus for different product lines without making any physical changes to the apparatus, apart from the possible substitution of a new printing element. The printing apparatus of the present invention is also capable of printing at more than one location on the same object, a capability which previously required additional or duplicate equipment. The invention has particular utility in connection with pad transfer printing, including multicolor pad transfer printing, but is also applicable to other printing methods.

In one aspect, therefore, the present invention relates to a programmable printing apparatus comprising an articulated mechanical arm including a plurality of connected arm sections having power-operated rotatable joints therebetween, a printing member carried by the articulated mechanical arm, and programmable control means connected to the articulated mechanical arm for controlling the motion thereof in order to bring the printing member into operative relationship with a surface to be printed. In a preferred embodiment of the invention, adapted for pad transfer printing, the printing apparatus is further provided with an engraved printing plate and with means for inking and scraping the printing plate. In this embodiment, the printing member comprises a deformable transfer pad which is capable of transferring a wet ink image from the printing plate to the surface to be printed. The control means is effective to control the movement of the articulated mechanical arm in a manner such that the transfer pad is brought first into contact with the inked printing plate in order to pick up a wet ink image therefrom, and is then brought into contact with the surface to be printed in order to deposit the image thereon. This arrangement provides what may be described as a "distributed" pad transfer printing apparatus, that is, one in which there is no fixed positional relationship among the pad mechanism, printing plate, and print receiving surface.

In another aspect, the present invention relates to a multicolor transfer pad printing method which may be carried out using the apparatus described and claimed herein. The method comprises the steps of providing first and second engraved printing plates carrying print legends corresponding to first and second color components, respectively, of a multicolor image; inking said first and second printing plates with inks having first and second colors, respectively, and scraping said printing plates to leave ink only in the engraved areas which define the print legends; bringing a deformable transfer pad into contact with the first printing plate in order to pick up a first ink image therefrom corresponding to the first color component of the multicolor image; bringing the transfer pad into contact with a location on the print receiving surface in order to deposit the first ink image thereon; bringing the same transfer pad into contact with the second printing plate in order to pick up a second ink image therefrom corresponding to the second color component of the multicolor image; and bringing the transfer pad into contact with the same location on the print receiving surface in order to deposit the second ink image thereon. If desired, a pad cleaning step may be carried out after the transfer pad deposits the first ink image on the print receiving surface and before the transfer pad picks up the second ink image from the second printing plate.

The described method has the advantage that a single transfer pad is used to deposit each successive color component of the multicolor image. This represents a considerable simplification in the equipment required to carry out multicolor printing. In addition, since the print receiving surface is not required to move form one printing station to another in order to receive the successive color separation images, a potential source of print registration error is removed.

BRIEF DESCRIPTION OF THE DRAWINGS

The various objects, advantages and novel features of the invention will be more readily understood from the following detailed description when read in conjunction with the appended drawings, in which.

Throughout the drawings, like reference numerals will be understood to refer to like parts.

DETAILED DESCRIPTION OF THE PREFERRED EMBODIMENT

Figure 1:
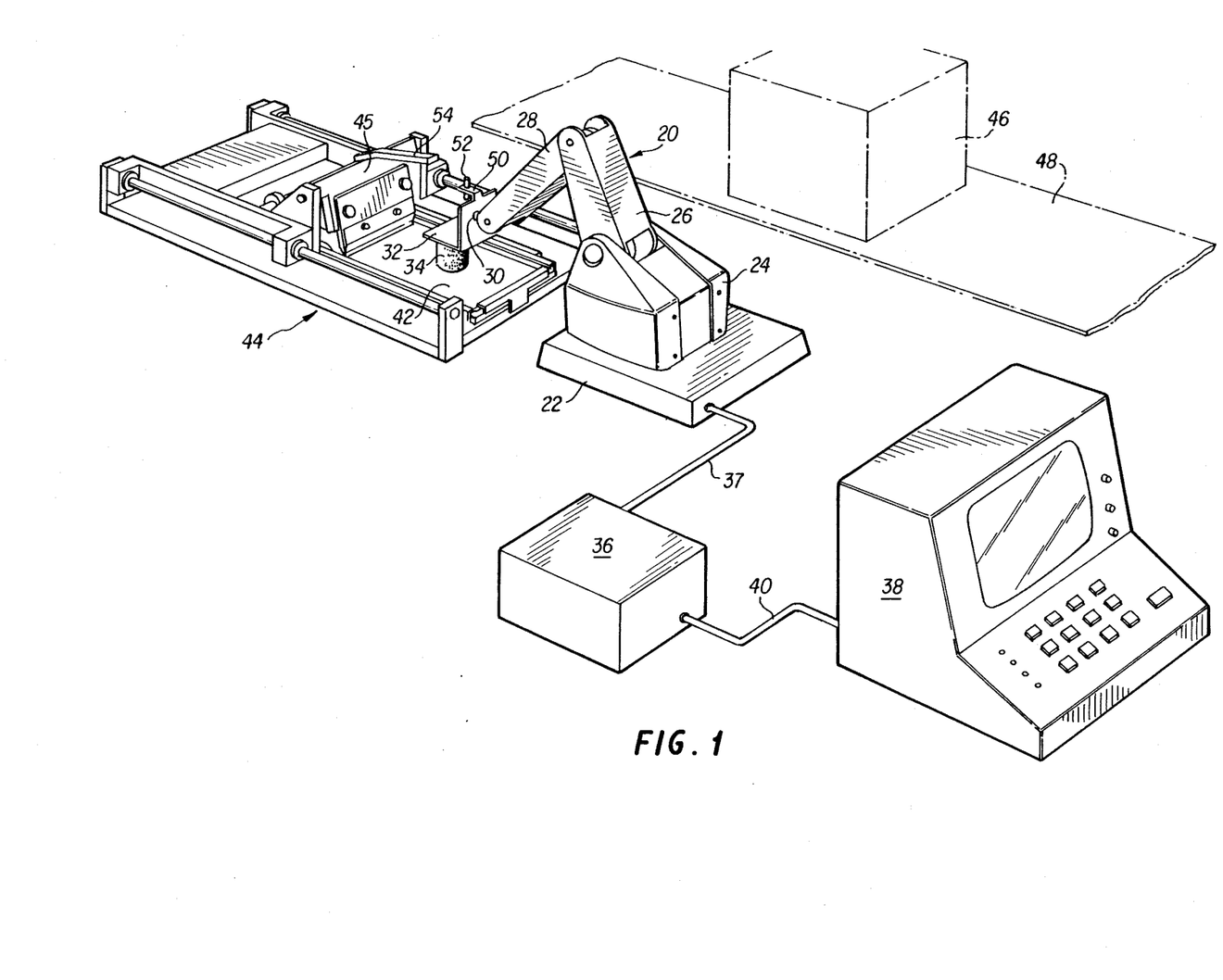
FIG. 1 is a perspective view of a programmable printing apparatus constructed in accordance with the present invention.

FIG. 1 illustrates a preferred embodiment of a programmable printing apparatus constructed in accordance with the present invention. The printing apparatus includes an articulated mechanical arm 20 which, in the preferred embodiment, comprises a five-axis robotic arm of a commercially available type. The robotic arm 20 comprises a fixed base or pedestal 22, a pivoting body section 24, an upper arm section 26, a lower arm section 28, and a wrist section 30. Affixed to the wrist 30, in place of the usual mechanical gripper, is an L-shaped mounting plate 32. The mounting plate 32 carries a resilient transfer pad 34, which is preferably made of silicone rubber or the like. The various sections of the robot arm 20 are movably connected by means of power-operated rotatable joints, and these joints can be operated alone or in combination to move the arm to the desired position. The maneuvering of the robot arm 20 is governed by a programmable control unit 36, to which the arm 20 is connected by means of a cable 37. The control unit 36 contains microprocessor circuitry and a program memory for storing point-to-point maneuvering instructions. A video display terminal 38, which may be a small general-purpose computer, is connected to the control unit 36 by means of a cable 40. The video display terminal 38 allows the operation of the robot arm 20 and control unit 36 to be monitored, and also permits the control unit 36 to be reprogrammed when it is desired to alter the operation of the robot arm 20.

In the illustrated embodiment, the legend to be printed is provided by means of an engraved printing plate 42. The plate 42 is carried by a plate holder 44, which also includes means 45 for inking and scraping the plate as will be described hereinafter. During each printing cycle, the plate is flooded with ink and is then scraped or doctored, so that the ink is left only in the engraved areas which define the legend to be printed. The robot arm 20 is maneuvered to bring the transfer pad 34 into contact with the printing plate 42, thereby causing the wet ink image to transfer from the plate 42 to the pad 34. The arm 20 is then maneuvered so that the transfer pad 34 is brought into contact with the article or surface to be printed, thereby transferring the wet ink image from the pad to the print receiving surface. After the image is transferred to the article 46, the robot arm 20 withdraws the pad 34 from the article surface and returns to the printing plate holder 44 in preparation for a subsequent printing cycle. As will be described, the mechanism 45 for inking and scraping the printing plate 42 may be operated by the robot arm 20 between printing operations. To this end, the L-shaped mounting plate 32 is formed with a small flange 50 which carries a projecting finger 52, the latter being engageable with a hole formed in the handle 54 of the inking and scraping device 45. In an alternative arrangement, not shown, a separate drive means may be provided for operating the inking and scraping mechanism 45 while the robot arm 20 is in motion between the printing plate 42 and the article 46.

In FIG. 1, the article to be printed is indicated in phantom as a box or carton 46 carried by a conveyor 48. It will ordinarily be preferable to operate the conveyor 48 in an intermittent manner, and to bring the pad 34 into contact with the article 46 during the interval when the conveyor 48 is stopped. Alternatively, if it is desired to operate the conveyor 48 continuously, the movement of the robot arm may be coordinated with the movement of the conveyor 48 while the pad 34 is in contact with the article 46.

Figure 2:
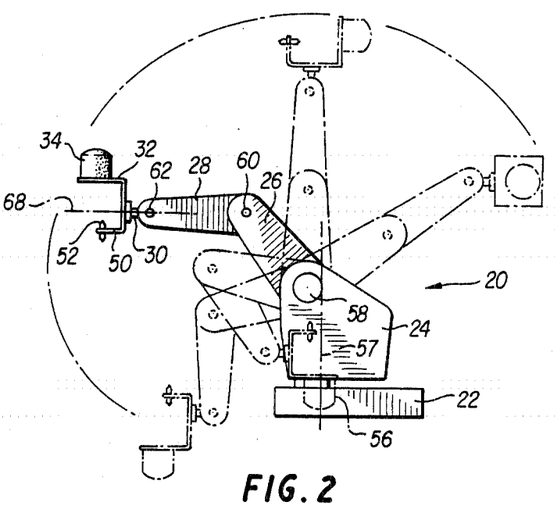
FIGS. 2 and 3 are elevational and plan views, respectively, illustrating the range of movement of the articulated mechanical arm.
Figure 3:
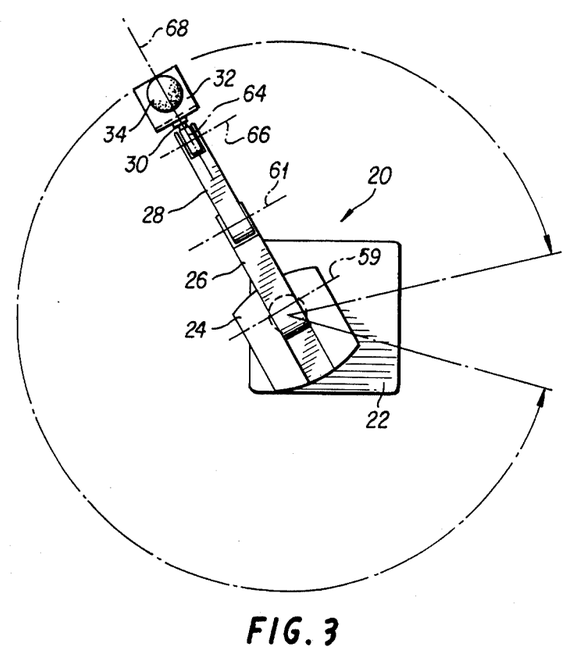

The details of the robot arm 20 and its range of movement are illustrated in FIGS. 2 and 3. A base casting 22 serves as a support for the robot arm and houses driver circuitry for a number of stepping motors mounted in the body section 24. A system of internal timing belts and pulleys transmit the torque of the stepping motors to steel cables which control the arm motion. A first rotatable joint 56 allows the body section 24 to swivel with respect to the base 22 through an arc of 330°, as indicated in FIG. 3. This motion occurs about a vertical axis 57, shown in FIG. 2, and allows the arm to pivot radially with respect to the base 22. A second rotatable joint 58 connects one end of the upper arm section 26 to the base section 24. This joint, which may be referred to as a shoulder joint, allows the upper arm section 26 to pivot about a horizontal axis 59 with respect to the base section 24. The maximum arc of movement of this joint is 140°. A third rotatable joint 60, which may be referred to as an elbow joint, connects the other end of the upper arm section 26 to one end of the lower arm section 28. The joint 60 allows the lower arm section 28 to pivot about a horizontal axis 61 with respect to the upper arm section 26. The maximum pivot arc of the lower arm section 28 is 140°. The wrist section 30 is connected to the other end of the lower arm section 28 by a pair of rotatable joints 62, 64. The inner joint 62 allows the wrist section 30 to pivot about a horizontal axis 66, the maximum arc of pivot being 180°. The axis 66 may be referred to as the pitch axis of the wrist section 30. The outer joint 64 enables the wrist section 30 to rotate about its own axis 68, which is perpendicular to the axis 66. The wrist section 30 can pivot through a full 360° arc about the axis 68, which may be referred to as the roll axis.

The robot arm 20 and the associated control unit 36 shown in FIG. 1 may be of the type manufactured by Microbot, Inc. of Mountain View, Calif. under the product name "Microbot Alpha". The control unit 36 may be programmed using a conventional computer, such as the computer 38 shown in FIG. 1, or with a separate teach control unit (not shown). The teach control unit allows the operator to program the control unit by manually sequencing the robot arm 20 through the desired series of operations. The desired path coordinates are then stored in the program memory of the control unit 36.

It should be understood that the robot arm 20 may be other than as described above, and it is not critical that any particular type of robot arm be used. Moreover, articulated mechanical arms other than those usually referred to as robot arms may be utilized in the practice of the present invention.

Figure 4:
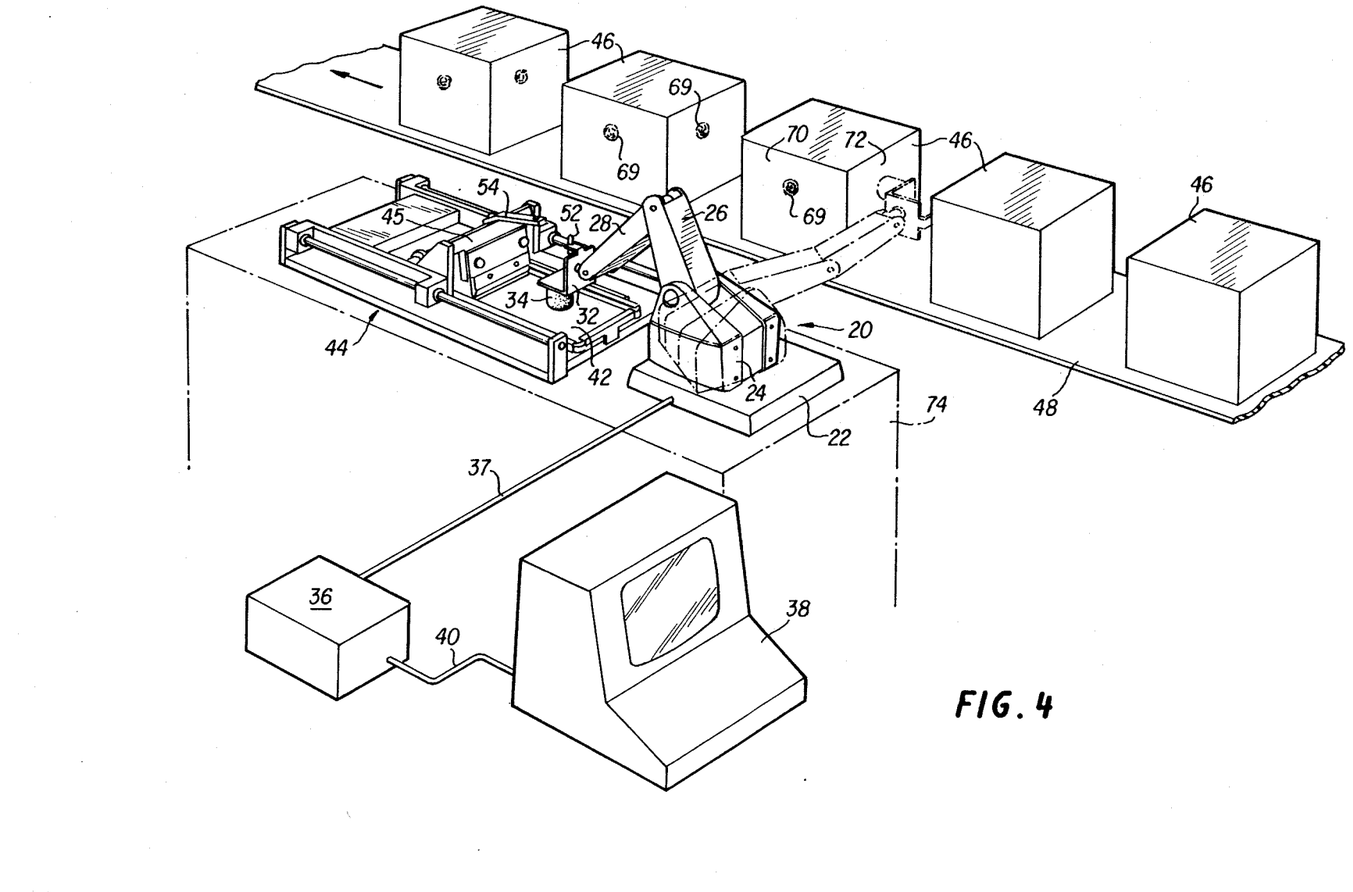
FIG. 4 is a perspective view illustrating the manner in which the programmable printing apparatus may be used to print on a series of identical articles carried on an adjacent conveyor.

FIG. 4 is a perspective view illustrating one possible application of the programmable printing apparatus of the present invention. The robot arm 20 and plate holder 44 are situated next to a moving product conveyor 48 carrying a series of boxes or cartons 46. In this example, the boxes 46 are all of the same size and are oriented in the same way on the conveyor 48. As each box arrives at a designated position opposite the robot arm 20, a sensor (not shown) stops the conveyor 48 and initiates the operation of the robot arm. In the illustrated example, it is desired to apply a printed legend 69 to two different faces of each box 46, specifically, the side face 70 opposite the robot arm 20 and the rear face 72 opposite the next box on the conveyor. This is accomplished by programming the control unit 36 in a manner such that the robot arm 20 makes two back-and-forth passes between the printing plate 42 and the box 46, once to print the surface 70 and a second time to print the surface 72. All of this will normally occur while the conveyor remains stopped. However, as previously noted, it is possible to print "on the fly" by coordinating the movement of the robot arm 20 with the movement of the conveyor 48. In this situation, it is necessary that the conveyor move slowly enough so that it remains within reach of the robot arm for the necessary interval and does not exceed the operating speed of the arm.

It will be noted that the product marking application illustrated in FIG. 4 embodies a number of advantages which are not readily obtainable with conventional types of product marking devices. First, as a result of the maneuverability and reach of the robot arm 20, the apparatus is capable of printing on surfaces which would not normally be accessible to conveyor-mounted marking apparatus, such as the rear surfaces 72 of the boxes 46. Second, because the robot arm can execute virtually any desired series of motions within its range of movement, and is not constrained to simple repetitive movements as in the case of conventional marking devices, it is possible to apply the printed legend at more than one location on each box 46. Finally, in the event that articles other than the boxes 46 are to be printed at some later time, the printing apparatus of FIG. 4 can be reprogrammed to adapt to the size and orientation of the new articles. This may be accomplished without making any mechanical alterations to the printing apparatus, other than possibly changing the printing plate 42 if a different legend is required for the new articles, or substituting a new pad 34 if needed in order to conform to the shape of the new articles.

All of the foregoing advantages are obtained regardless of the specific printing method that is carried out by the programmable printing apparatus. In the particular case of pad transfer printing, however, the present invention has an additional advantage in that it provides what amounts to a "distributed" pad transfer printing machine, that is, one in which there is no fixed positional relationship among the pad mechanism, printing plate, and print receiving surface. This represents a significant departure from conventional types of pad transfer printing apparatus and allows the use of the pad transfer printing technique in situations where, due to space limitations or other constraints, the conventional apparatus would not be practical.

In practice, it may be found useful to mount the components of the printing apparatus on a movable cart or platform 74, as indicated in phantom in FIG. 4. The cart may then be moved from place to place within a manufacturing plant in order to print on different types of products.

In the embodiment of FIG. 4, it is not strictly necessary that the articles 46 be identical in size and orientation as long as the printing apparatus is provided with some means for detection and compensating for any variations. This may be done either by placing the articles on the conveyor 48 in a predictable pattern (e.g., large boxes alternating with small boxes), or by providing appropriate sensing equipment which allows the size and orientation of the articles to be determined by the printing apparatus. Such equipment may take the form of mechanical feelers, photoelectric sensors, weighing devices, or the like. The outputs provided by the sensing equipment may be used to select among different program routines in the control unit 36, each corresponding to a different type of article.

Insofar as the spacing between successive articles is concerned, this is not critical as long as the stopping of the conveyor 48 is keyed to the presence of an article at a predetermined location with respect to the robot arm 20. If this is not the case, however, then it becomes necessary to space the articles 46 uniformly along the conveyor 48 so that each article is at the proper position with respect to the robot arm 20 when the conveyor stops.

Figure 5:
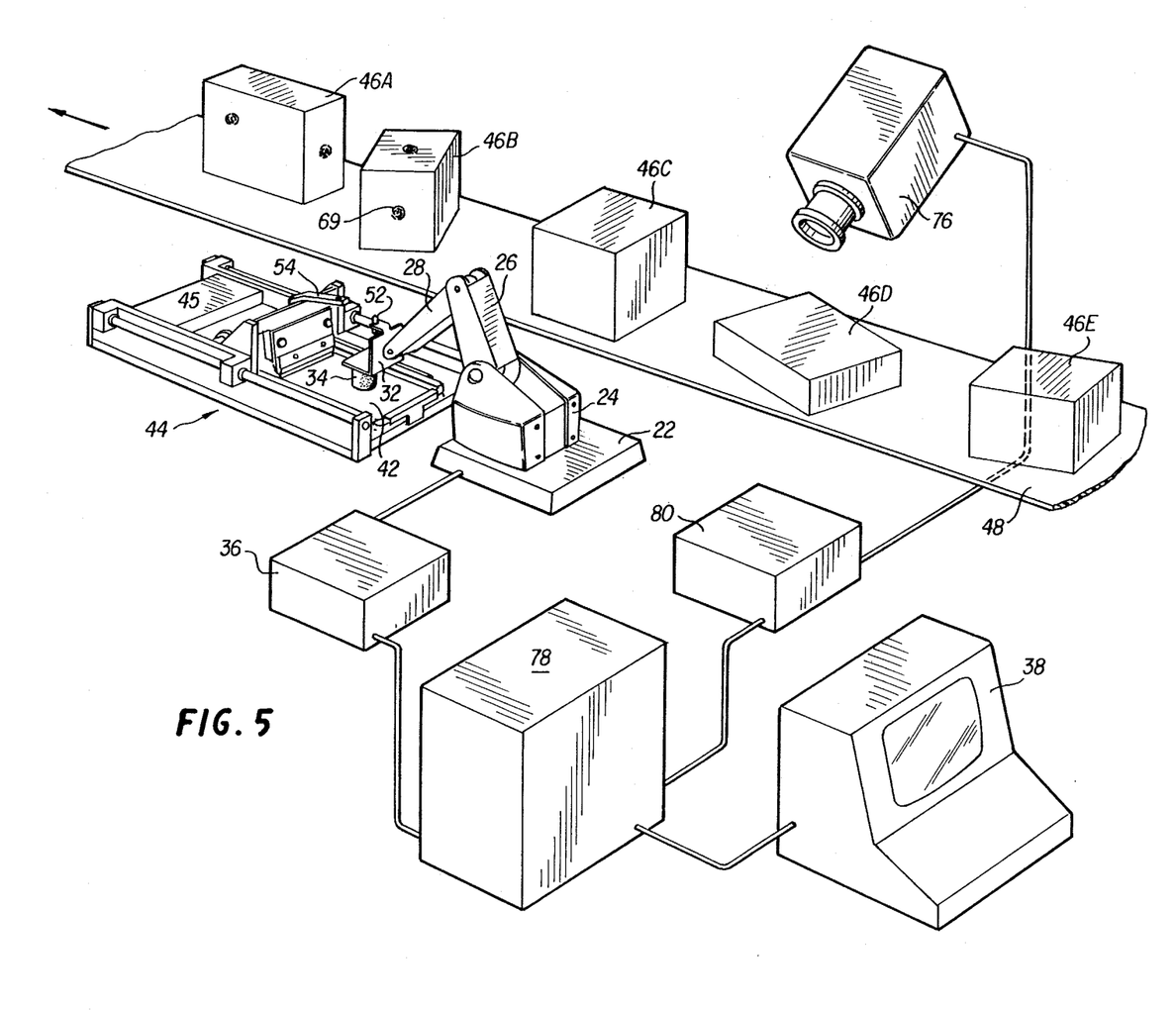
FIG. 5 is a perspective view illustrating a second embodiment of the invention, which is capable of printing on articles of random size, orientation and spacing.

FIG. 5 illustrates a second embodiment of the invention in which articles 46a through 46e of different sizes and shapes are oriented and spaced randomly along the conveyor 48. In this embodiment, the printing apparatus is provided with a visual capability by means of a video camera 76. The camera 76 is positioned at a fixed location which allows it to view a predetermined portion of the conveyor 48 located upstream of the robot arm 20. In this way, the size, shape and orientation of each article can be determined prior to the arrival of the article at the printing location adjacent to the robot arm 20. This information is then used to derive programming instructions for the robot arm which allow the specific article to be printed in the desired manner. In order to realize this function, a host computer 78 is provided and serves as a central control unit for the robot arm 20, video camera 76 and display terminal 38. The host computer 78 is connected to the video camera 76 through a video controller 80 and is connected to the robot arm 20 through the control unit 36. The video display terminal 38 is connected directly to the host computer 78 and is primarily used for input-output functions in this embodiment.

Figure 6:
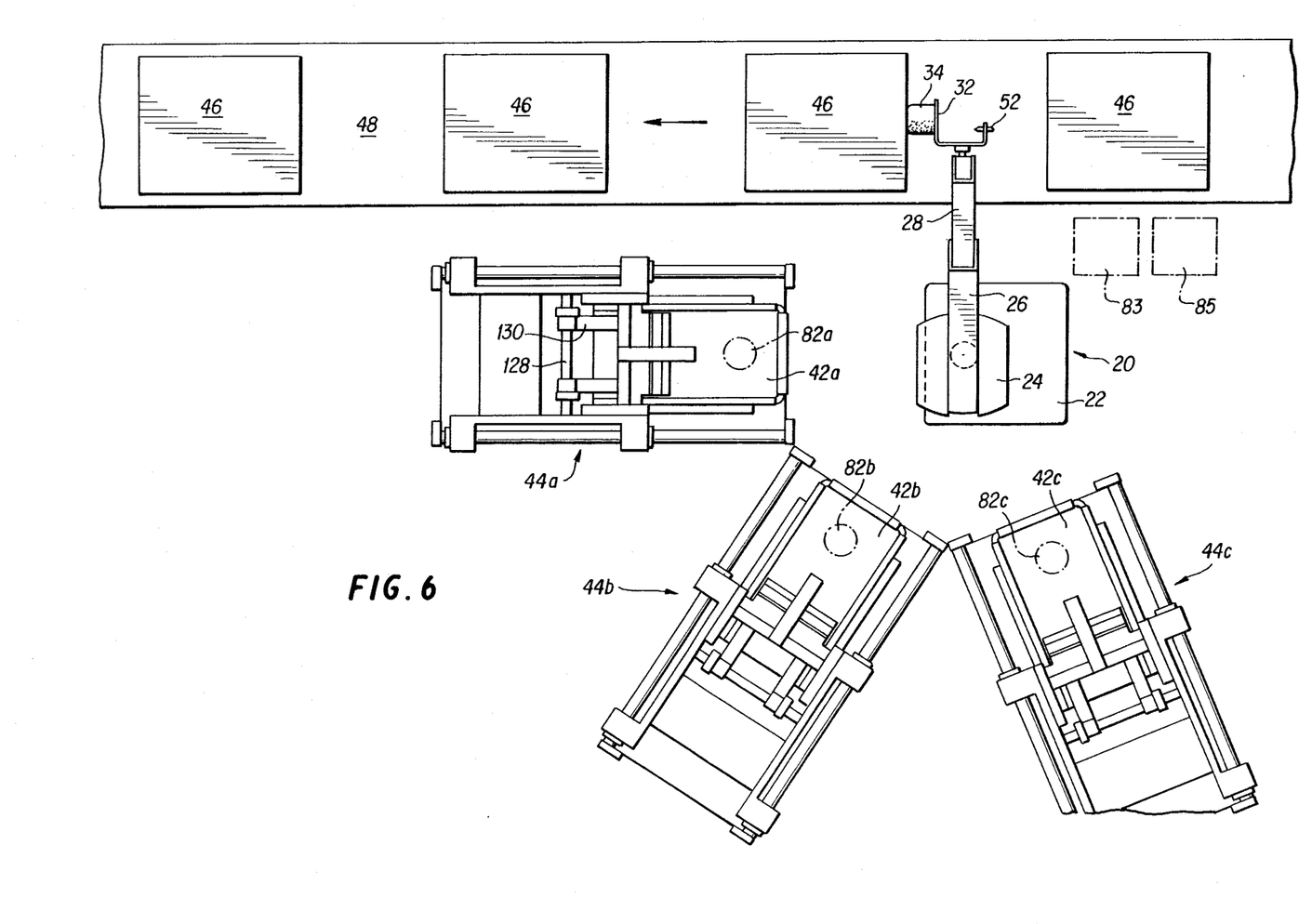
FIG. 6 is a plan view illustrating a third embodiment of the invention, adapted for multicolor printing.

FIG. 6 illustrates a multicolor printing arrangement employing the programmable printing apparatus of the present invention. This embodiment is similar to that of FIG. 4, except that the control unit 36 and video display terminal 38 have been omitted for clarity. In the embodiment of FIG. 6, the single engraved printing plate 42 of FIG. 4 is replaced by three engraved printing plates 42a, 42b and 42c carried by three printing plate holders 44a, 44b and 44c, respectively. Each printing plate carries a print legend corresponding to a single color component of the complete multicolor image. Thus, the engraved legend 82a on the plate 42a may define the portions of the final image which are to be printed in a first color, while the engraved legends 82b and 82c on the plates 42b and 42c may define the portions of the final image which are to be printed in second and third colors, respectively. Each of the printing plates 42a, 42b and 42c is provided with a supply of ink of the required color.

In operation, the article 46 to be printed is stopped at a predetermined location with respect to the robot arm 20 by arresting the motion of the conveyor 48. During the stopped interval, the robot arm 20 moves back and forth a total of three times between the respective printing plates and the article surface. Thus, for example, the first color is applied by bringing the pad 34 first into contact with the inked legend 82a on the printing plate 42a, and then into contact with the designated location on the article 46. Next, the second color is applied by bringing the transfer pad 34 first into contact with the inked legend 82b on the printing plate 42b, and then into contact with the same location on the article. Finally, the third color is applied by bringing the transfer pad 34 first into contact with the inked legend 82c on the printing plate 42c, and then into contact with the same location on the article.

By virtue of the foregoing method, a multicolor image may be created on the article surface using three separate printing plates but only one transfer pad. This represents a considerable simplification over existing techniques utilizing multiple transfer pads or a number of separate pad printing machines. In addition, since the article 46 is not required to move from one position to another in order to receive each successive color, print registration errors can be minimized.

The surface characteristics of the silicone rubber transfer pad 34 are such that the wet ink images transfer completely to the article surface, without leaving any significant residue on the pad. As a result, there is ordinarily no problem with respect to the use of the same pad for printing successive image components in different colors. However, in order to insure that the pad is completely free of ink of one color prior to printing a different color, a pad cleaning step may be carried out subsequent to each color printing operation. This may be done by providing a solvent bath 83 and a drying block 85 at positions within the range of movement of the robot arm 20, and programming the arm movement in a manner such that, after each successive color is printed, the transfer pad 34 is briefly lowered into the solvent bath and then brought into contact with the drying block. The drying block 85 is provided with an absorbent surface made of felt or a similar material, and serves as a blotter for removing any solvent which may adhere to the transfer pad 34.

In the multicolor printing method described above, each article 46 is printed successively with all of the desired colors before any printing is carried out on the next article. However, the invention is not limited to this mode of operation. For example, if two articles are within the range of movement of the arm 20 at the same time, it may be desired to print the same color component of the final image on both articles before proceeding to the next color. The same principle is applicable to three or more articles, the maximum number of articles being limited only by the range of movement of the robot arm.

It will be apparent that the embodiment of FIG. 6 may be used for purposes other than multicolor printing. For example, if it is desired to print three different legends at three different locations on each article 46, this may be accomplished by providing the desired legends on the printing plates 42a, 42b, 42c and programming the robot arm 20 to move to a different position on the article during each printing cycle. In a similar manner, fixed and variable data may be printed on the articles 46 by providing one of the printing plates with fixed data and the others with variable data.

The embodiment of FIG. 6 may be modified, if desired, by mounting the printing plate holders 44a, 44b, 44c, together with the solvent bath 83 and drying block 85, on an intermittently rotating turret or turntable. This provides a single location at which the transfer pad 34 may be brought into contact with the printing plates 42a, 42b, 42c, the solvent bath 83, or the drying block 85. The periodic indexing of the turret or turntable may be carried out automatically under the control of the programmable control unit 36. This arrangement simplifies the movement of the robot arm 20, saves time during successive printing cycles, and renders the programming of the control unit 36 less complex. In addition, registration errors are minimized during multicolor printing, since the robot arm 20 is not required to move to different positions in order to pick up the successive color components of the multicolor image.

FIGS. 7-10 illustrate the details of the printing plate holder 44. The purpose of this device is to support the engraved printing plate 42 and to provide for inking and scraping of the plate during each printing cycle. In the illustrated embodiment, the inking and scraping mechanism 45 is operated by the robot arm 20. However, as indicated previously, this is not strictly necessary and it may be desired to provide separate drive means for the inking and scraping mechanism 45.

Figure 7:
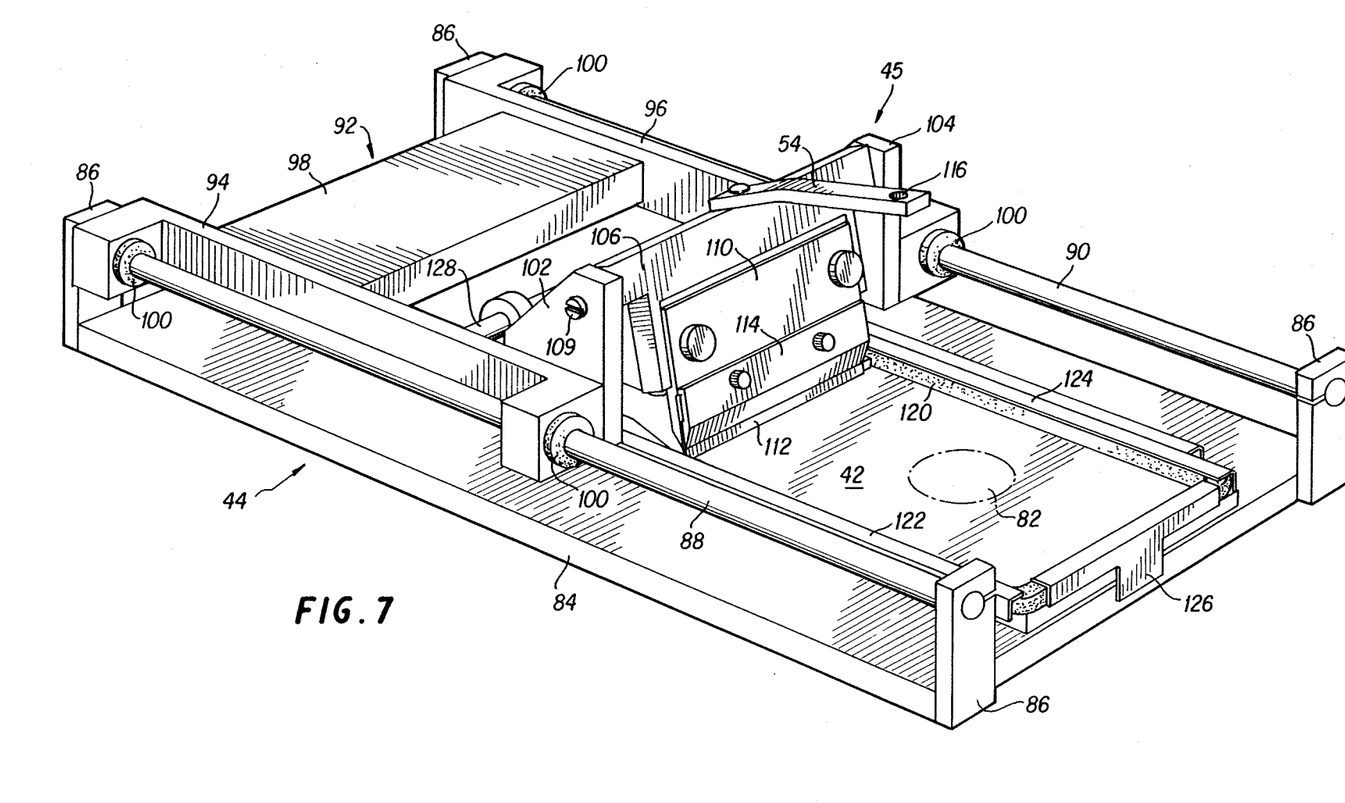
FIG. 7 is a perspective view of a printing plate holder which may be used in connection with the programmable printing apparatus of the present invention.

The printing plate holder 44 includes a rectangular base plate which is provided with upright supports 86 at each of its four corners. The support 86 carry a pair of cylindrical bars or rails 88, 90 which extend parallel to the longitudinal edges of the base plate 84. A roughly H-shaped slide device comprising a pair of longitudinal side members 94, 96 and a cross-member 98 is slidably supported on the rails 88, 90 by means of linear ball bearing units 100 mounted at each corner of the slide device. Attached to the forward interior portions of the side members 94, 96 are a pair of upright supports 102, 104, which serve as mounting points for a pivotable blade holder mounting device 106. The mounting device 106 pivots with respect to a horizontal axis 108 and is supported at each end by eccentric screws 109. The lower portion of the mounting device 106 carries a blade holder 110. A doctor blade 112 is retained between the blade holder 110 and a blade clamp 114. The alignment of the doctor blade 112 relative to the printing plate 42 may be adjusted by turning the eccentric screws 109, which has the effect of raising or lowering the ends of the mounting device 106 with respect to the upright supports 102, 104.

A projecting handle or lever 54 is secured to the upper edge of the blade holder mounting device 106 and is provided with a hole 116 near its outer end. The hole 116 is engaged by the finger 52 of the robot arm in order to allow the robot arm to raise or lower the lever 54. This has the effect of pivoting the blade holder mounting device 106 and thereby moving the edge of the doctor blade 112 into or out of contact with the printing plate 42.

The printing plate 42 is mounted on a backing plate 118, which is in turn supported by the base plate 84. A rectangular rubber gasket 120 extends completely around the upper periphery of the printing plate 42 and serves to confine the ink thereon. A pair of side clamps 122, 124 and an end clamp 126 hold the gasket in place and also serve to secure the printing plate 42 to the backing plate 118.

A fixed shaft 128 extends transversely between the side members 94, 96 of the slide device 92 in order to serve as a support for a generally U-shaped ink spreader 130 (also visible in FIG. 6). The ink spreader is pivotable on the shaft 128 and has a scoop-shaped forward portion 132 which rests on the surface of the printing plate 42.

Figure 8:
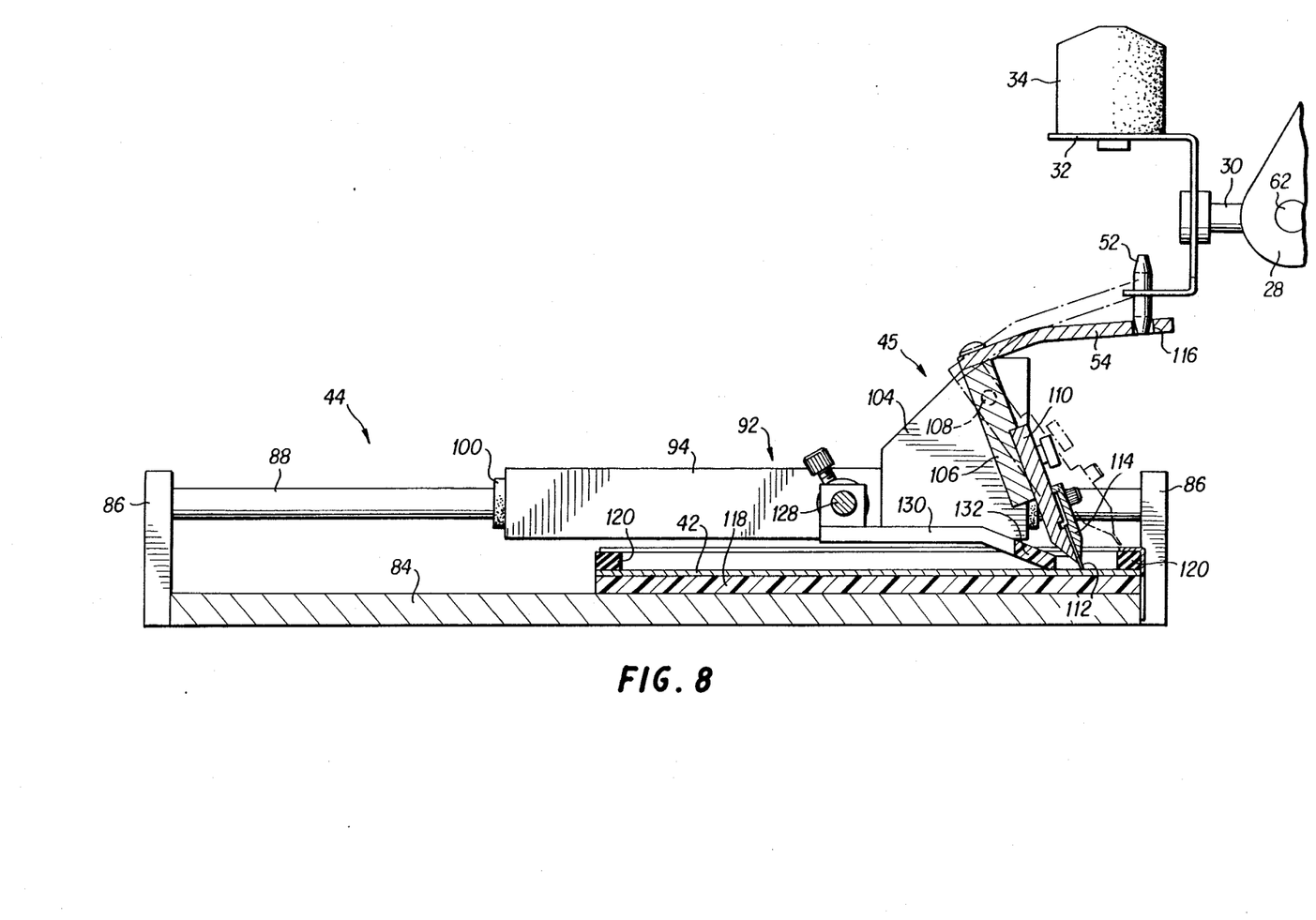
FIGS. 8–10 are sectional views of the printing plate holder, illustrating the manner in which the inking and scraping mechanism is operated by the articulated mechanical arm.

The manner in which the inking and scraping mechanism of the printing plate holder 44 is operated by the robot arm 20 will now be explained with reference to FIGS. 8-10. Referring first to FIG. 8, let it be assumed that a supply of ink has been deposited on the printing plate 42 and has been spread uniformly across the surface of the plate by the ink spreader 130. It is further assumed that the handle 54 is in a raised position as indicated in phantom, so that the doctor blade 112 is raised out of contact with the surface of the printing plate. At the beginning of a printing cycle, the robot arm moves from a home position to a position in proximity with the handle 54, and, using the side of the L-shaped mounting plate 32, depresses the handle 54 to the solid line position of FIG. 8. This motion brings the lower edge of the doctor blade 112 into contact with the surface of the printing plate 42. With the handle 54 in this position, the hole 116 is now in a known position and can be engaged by the outwardly facing portion of the finger 52 (i.e., the portion facing away from the transfer pad 34). This engagement is illustrated in FIG. 8.

Figure 9:
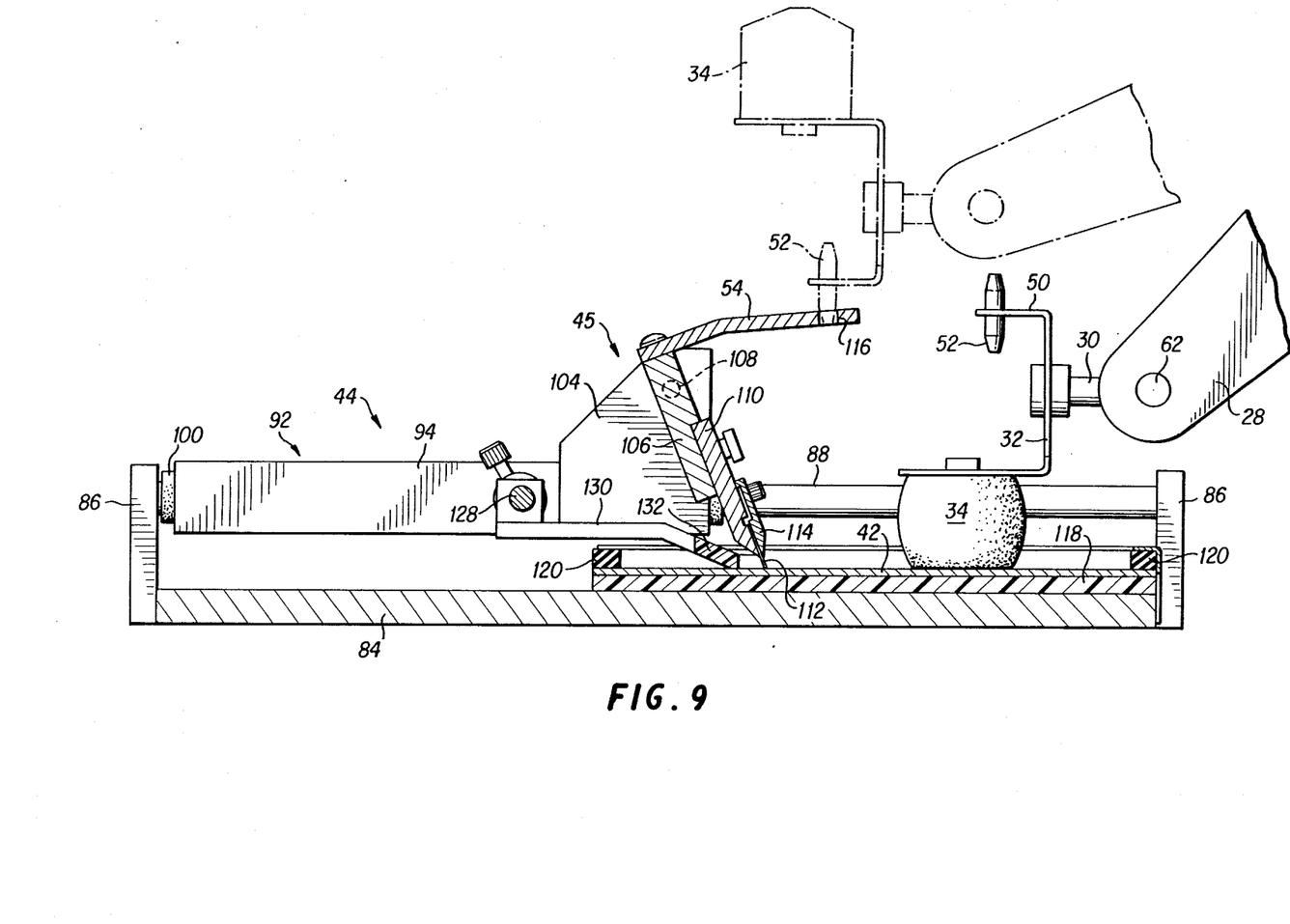
Figure 10:
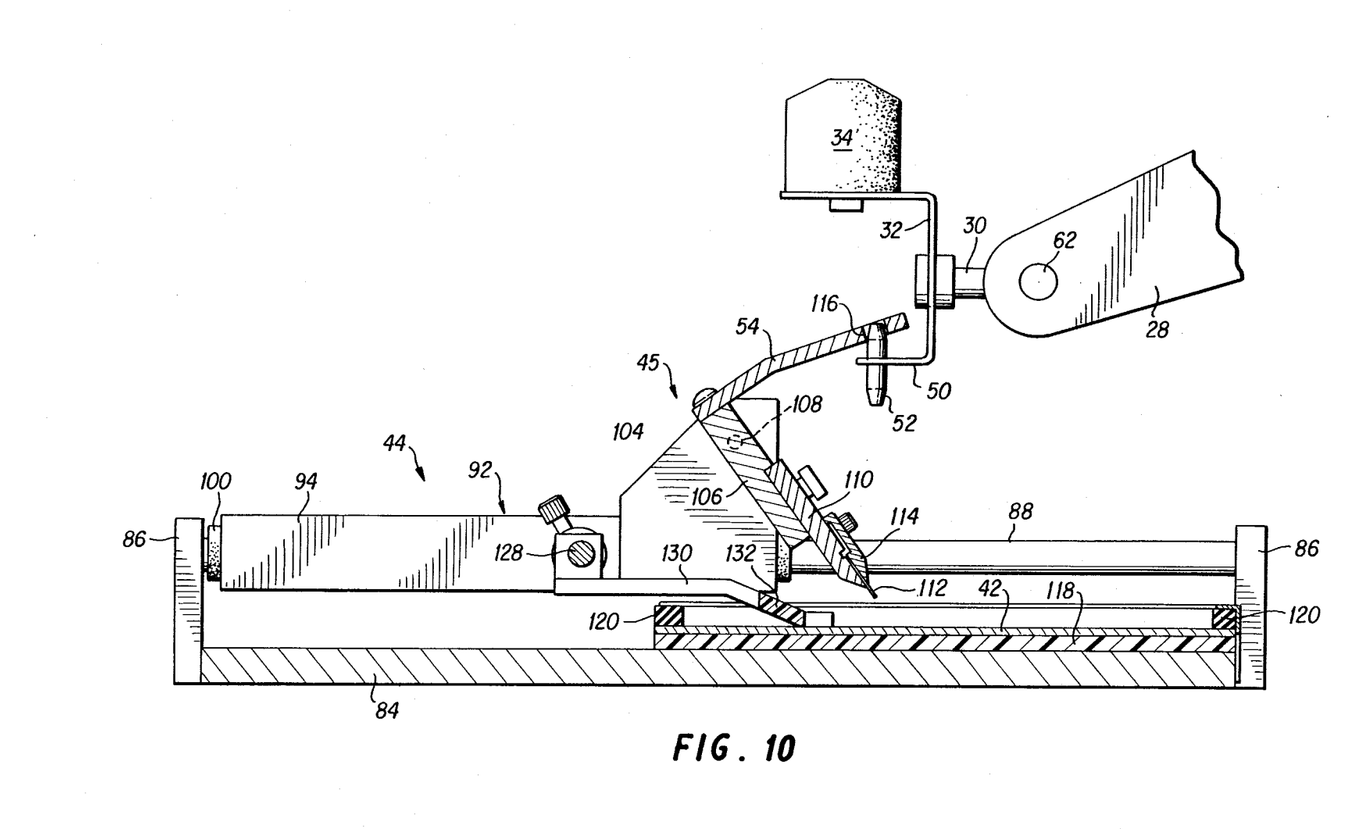

The next step, illustrated in FIG. 9, is a horizontal movement of the robot arm in a direction from right to left. This motion is transmitted via the handle 54 to the slide device 92, causing it to move in a leftward direction along the rails 88, 90. As a result, the surface of the printing plate is scraped by the doctor blade 112, leaving the ink only in the engraved areas 82 which define the legend to be printed. The ink removed from the remaining areas of the plate is pushed in a leftward direction and accumulates to some extent between the doctor blade and the forward edge of the ink spreader 130. The robot arm is then maneuvered so that the finger 52 disengages from the hole 116, and the plate 32 is pulled back toward the right in order to clear the handle 54. This is followed by a 180° motion of the wrist section 30 of the robot arm to bring the transfer pad 34 into a downwardly facing position. The robot arm is then moved in a downward direction to bring the transfer pad 34 into contact with the printing plate 42, as shown in solid outlines in FIG. 9. The robot arm is then moved upwardly in order to separate the transfer pad 34 from the surface of the printing plate. The wet ink image is now carried on the surface of the pad, and may be transferred to the desired print receiving surface. This is accomplished by maneuvering the robot arm in the necessary manner to bring the transfer pad 34 into momentary contact with the surface to be printed.

Following transfer of the image to the print receiving surface, the robot arm is again moved into proximity with the handle 54 of the printing plate holder 44. The mounting plate 32 is rotated so that the inwardly facing portion of the finger 52 (i.e., the portion facing the transfer pad 34) is aligned with the lower opening of the hole 116. Once in this orientation, the robot arm is moved in such a way as to cause the finger 52 to enter the hole 116. The robot arm 20 then moves the mounting plate 32 vertically upward, thereby lifting the handle 54 and separating the doctor blade 112 from the printing plate 42. At this point, the various components are in the positions illustrated in FIG. 10. With the doctor blade still in a raised position, the robot arm is moved in a direction from left to right in order to move the slide device 92 to its rightmost position along the rails 88, 90. This causes the ink spreader 130 to cover the printing plate with a uniform layer of ink in preparation for a subsequent printing cycle. The robot arm then moves in such a way as to withdraw the finger 52 from the hole 116 and to pull the plate 32 back toward the right in order to clear the handle 54. This completes the printing cycle. The next cycle begins with the downward movement of the handle 54 as already described with reference to FIG. 8, and the preceding steps are then repeated.

Although the present invention has been described with reference to a preferred embodiment, it should be understood that the invention is not limited to the details thereof. In particular, the invention is not limited to pad transfer printing since it will be readily appreciated that the articulated mechanical arm may be used to carry various types of impact and non-impact printing devices. For some types of printing devices, such as ink jet print heads, the robot arm may be used not only to bring the printing device into operative relationship with the articles to be printed, but also to create the printed legend by executing a programmed series of movements across the article surface. It should also be noted that the articulated mechanical arm need not be a general purpose robot arm as in the disclosed embodiment, but may instead comprise other types of articulated electromechanical, pneumatic or hydraulic devices which can be controlled by programmable means. These and other substitutions and modifications may be made in the disclosed embodiment without departing from the spirit and scope of the invention as defined in the appended claims.

What is claimed is:

1. A multicolor printing method comprising:
providing first and second engraved printing plates carrying print legends corresponding to first and second color components, respectively, of a multicolor image;
inking said first and second printing plates with inks having first and second colors, respectively, and scraping said printing plates to leave ink only in the engraved areas which define the print legends;
bringing a deformable transfer pad into contact with the first printing plate in order to pick up a first ink image therefrom corresponding to the first color component of the multicolor image;
bringing the transfer pad into contact with a location on the print receiving surface in order to deposit the first ink image thereon;
bringing the same transfer pad into contact with the second printing plate in order to pick up a second ink image therefrom corresponding to the second color component of the multicolor image; and
bringing the transfer pad into contact with the same location on the print receiving surface in order to deposit the second ink image thereon.

2. A multicolor printing method as claimed in claim 1, wherein the further step of cleaning the transfer pad is carried out after the transfer pad deposits the first ink image on the print receiving surface and before the transfer pad picks up the second ink image from the second printing plate.

3. A multicolor printing method as claimed in claim 2, wherein the step of cleaning the transfer pad comprises:
temporarily placing the transfer pad into a solvent bath; and
removing any solvent adhering to the transfer pad.

4. A multicolor printing method as claimed in claim 3, wherein the step of removing any solvent adhering to the transfer pad comprises bringing the transfer pad into contact with an absorbent material.

5. A programmable printing apparatus comprising:
an articulated mechanical arm including a plurality of connected arm sections having power-operated rotatable joints therebetween;
a printing member carried by said articulated mechanical arm;
programmable control means connected to said articulated mechanical arm for controlling the motion thereof in order to bring the printing member into operative relationship with a surface to be printed;
an engraved printing plate; and
means for inking and scraping said printing plate; wherein:
said printing member comprises a deformable transfer pad capable of transferring a wet ink image from the printing plate to the surface to be printed;
said control means is effective to control the movement of the articulated mechanical arm in a manner such that the transfer pad is brought first into contact with the inked printing plate in order to pick up a wet ink image therefrom, and is then brought into contact with the surface to be printed in order to deposit the image thereon;
said articulated mechanical arm carries, in addition to the printing member, means for engaging said inking and scraping means; and
said control means is effective to cause the articulated mechanical arm to operate the inking and scraping means with said engaging means prior to bringing the transfer pad into contact with the printing plate.

6. A programmable printing apparatus as claimed in claim 5, wherein said articulated mechanical arm comprises:
a fixed base section;
a body section carried by said base section, said body section being pivotable about a vertical axis with respect to said base section by means of a first rotatable joint;
an upper arm section having one end connected to said body section by means of a second rotatable joint, said upper arm section thereby being pivotable about a horizontal axis with respect to the body section;

a lower arm section having one end connected to the other end of said upper arm section by means of a third rotatable joint, said lower arm section thereby being pivotable about a horizontal axis with respect to the upper arm section;

a wrist section having one end connected to the other end of the lower arm section by means of fourth and fifth rotatable joints, said fourth rotatable joint allowing the wrist section to pivot about a horizontal axis with respect to the lower arm section, and said fifth rotatable joint allowing the wrist section to rotate about its own axis; and said wrist section having at its other end said transfer pad and said engaging means.

7. A programmable printing apparatus as claimed in claim 5, wherein said programmable control means is effective to control the motion of the articulated mechanical arm in a manner such that the transfer pad is brought successively into contact with at least two different print locations.

8. A programmable printing apparatus as claimed in claim 5, further comprising a conveyor for carrying a plurality of articles having surfaces to be printed, said control means being effective to control the motion of the articulated mechanical arm in a manner such that the transfer pad is brought into contact with at least two different print locations on each article carried by said conveyor.

9. A programmable printing apparatus as claimed in claim 5, further comprising:

a conveyor for carrying a plurality of articles having surfaces to be printed; and means for detecting one or more of the size, shape and orientation of the articles on the conveyor;

and wherein said control means is effective to control the motion of the articulated mechanical arm in accordance with information provided by said detecting means.

10. A programmable printing apparatus as claimed in claim 9, wherein said detecting means comprises a video camera.

11. A programmable printing apparatus comprising:

an articulated mechanical arm including a plurality of connected arm sections having power-operated rotatable joints therebetween;

a printing member carried by said articulated mechanical arm;

programmable control means connected to said articulated mechanical arm for controlling the motion thereof in order to bring the printing member into operative relationship with a surface to be printed;

an engraved printing plate; and means for inking and scraping said printing plate; wherein:

said printing member comprises a deformable transfer pad capable of transferring a wet ink image from the printing plate to the surface to be printed;

said control means is effective to control the movement of the articulated mechanical arm in a manner such that the transfer pad is brought first into contact with the inked printing plate in order to pick up a wet ink image therefrom, and is then brought into contact with the surface to be printed in order to deposit the image thereon; and said engraved printing plate is adapted for printing a single color component of a multicolor image;

and further comprising at least one additional printing plate for printing a different color component of a multicolor image and means for inking and scraping said additional printing plate, said control means being effective to control the movement of the articulated mechanical arm in a manner such that the transfer pad is brought into contact with said printing plates at different times in order to deposit different color components of a multicolor image at the same location on a surface to be printed.

12. A programmable printing apparatus as claimed in claim 11, wherein said articulated mechanical arm comprises:

a fixed base section;

a body section carried by said base section, said body section being pivotable about a vertical axis with respect to said base section by means of a first rotatable joint;

an upper arm section having one end connected to said body section by means of a second rotatable joint, said upper arm section thereby being pivotable about a horizontal axis with respect to the body section;

a lower arm section having one end connected to the other end of said upper arm section by means of a third rotatable joint, said lower arm section thereby being pivotable about a horizontal axis with respect to the upper arm section;

a wrist section having one end connected to the other end of the lower arm section by means of fourth and fifth rotatable joints, said fourth rotatable joint allowing the wrist section to pivot about a horizontal axis with respect to the lower arm section, and said fifth rotatable joint allowing the wrist section to rotate about its own axis; and said wrist section having at its other end said transfer pad.

13. A programmable printing apparatus as claimed in claim 11, further comprising means for cleaning the transfer pad after each successive color component is deposited on the surface to be printed.

14. A programmable printing apparatus as claimed in claim 13, wherein said cleaning means comprises a solvent bath and a drying block made of an absorbent material, and wherein said control means is effective to place the transfer pad into the solvent bath and then into contact with the drying block after each successive color component is deposited on the surface to be printed.

* * * * *